Oct. 7, 1941.   A. J. GRABACH   2,258,449
GROUND WHEEL MOUNTING, ESPECIALLY FOR TRAILERS
Filed June 6, 1940
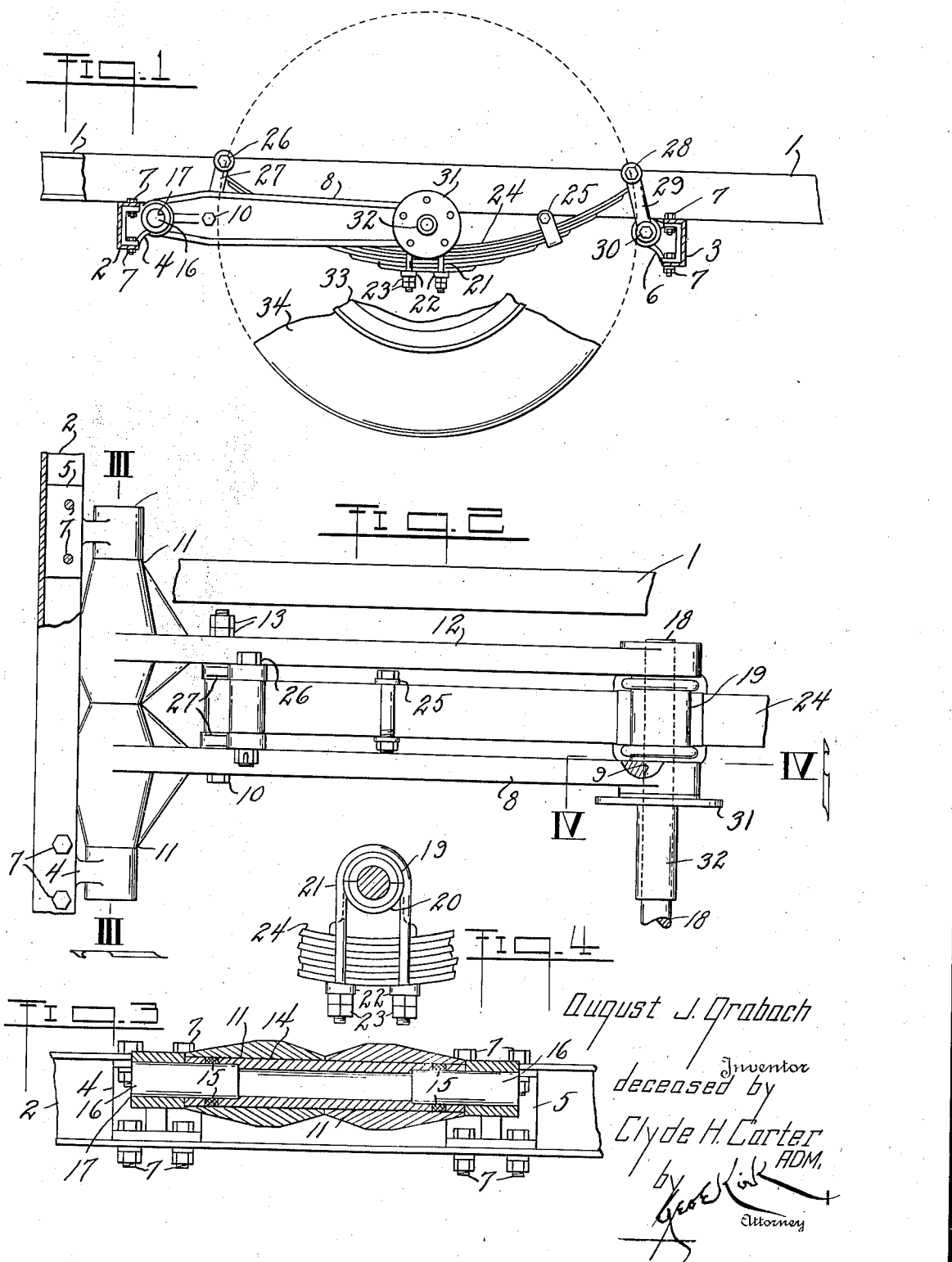

Patented Oct. 7, 1941

2,258,449

UNITED STATES PATENT OFFICE 2,258,449

GROUND WHEEL MOUNTING, ESPECIALLY FOR TRAILERS

August J. Grabach, deceased, late of Toledo, Ohio, by Clyde H. Carter, administrator, Toledo, Ohio, assignor to Mayme B. Grabach, Toledo, Ohio Application June 6, 1940, Serial No. 339,042

1 Claim. (Cl. 267—19)

This invention relates to yieldably sustaining a vehicle chassis.

This invention has utility when incorporated in vehicle ground wheel floating mountings for an axle section.

Referring to the drawing:

Fig. 1 is a side elevation, with parts broken away, showing the mounting as adapted to one of a pair of ground wheels for a trailer adapted to be a load carrier as following a truck or other source of power;

Fig. 2 is a plan view of the mounting for the axle in carrying the wheel of Fig. 1;

Fig. 3 is a section on the line III—III, Fig. 2, showing the fulcrum mounting for the pair of levers; and Fig. 4 is a section on the line IV—IV, Fig. 2, showing the axle assembly with the leaf spring.

Trailer chassis is disclosed as having a frame comprising side bars 1 between which extend cross channels 2, 3. In the carrying out of the invention herein, wherein the structure is sold as equipment, these channels may have similar brackets 4, 5, 6, anchored therewith even by welding. When the device is substitutive installation or accessory it is more convenient to use bolts 7 in assembling these brackets 4, 5, 6, in the respective channels 2, 3, as projecting outside the bars 1.

Lever 8 is shown as having eye 9 at its free end, bolt 10 intermediate its length, and fulcrum bearing 11 as rights and lefts in assembly. Lever 12 is in parallelism with the lever 8 and nuts 13 on the bolt 10 assemble or connect these levers intermediate the length for the respective bearings 11 to be in alignment on steel tubing or shaft 14 having weld connections 15 with stub shafts 16 in the respective eyes 17 of the brackets 4, 5. In the operation there is occasion for but slight rocking movement in this axis determined by this pipe 14 and stub shafts 16. The rotation or rocking may be between the pipe 14 and the bearings 11 or rocking action may be between the shafts 16 and the eyes 17 in the few degrees or rocking of operation. In this but slight movement there is rare occasion to shift or replace and the assembly is desirably one against casual disturbance, and when the assembly of the brackets be by welding, this fulcrum 14, 16, is a positive anchor with the chassis or trailer frame.

The levers 8, 12, at their free ends are assembled on stub axle 18 to form an arm. Block 19 with companion block 20 are engaged by U-bolts 21 having washers 22 and nut 23 to set such up as a saddle for semi-elliptic or leaf spring 24 having clamps 25 to hold these in position. This leaf spring 24, as between the levers 8, 12, of the arm, extends away from the axle 18 toward the fulcrum or mounting 14 and has pivot connection 26 with links 27 forming a shackle from the bolt 10. The remote end of this leaf spring 24 as beyond the axle 18 extends to pivot bearing 28 for pair of links 29 forming shackle connection to bolt 30 mounted in the eye of the bracket 6. There is thus provided a floating mounting for the axle 18 with which there is fixed flange 31 having sleeve 32. On this sleeve 32 there may be mounted bearing carrying wheel 33 having pneumatic tire 34 as one of the pair of ground wheels, say for a two wheel type of trailer such as the living-quarter providing type.

This floating mounting for the axle 18 as carrying the ground wheel 33, 34, permits the respective ground wheels to give or take load or irregularity disturbances independently and in a cushion-way transmit such to the chassis of the trailer. In this give operation the arm comprising levers 8, 12, is desirably one extending in the trailing direction, that is, for the vehicle to proceed as normally drawn toward the left in Fig. 1. As the disturbance strikes the pneumatic tire 34 it is cushioned in the tire. Therefrom the concussion may act on the spring 24. The tendency to straighten such spring is compensated by the respective shackles 27, 29. The shackle 27 to an extent distributes its lift action or strain in the arm 8, 12. With the axle 18 construed as the power load-applying portion, and the bearing 14, 16, as the fulcrum, there is a shifting of the bolt 10 in this strain, which in practice has been a factor toward comfort or smooth riding in the chassis beyond that to be expected from the rigidity of the spring 24. This means that, as the change of length of the spring is compensated in the shackles, the movable pivot 10 for the shackle 27 is an additional smoothing out factor for the efficient operation of this floating axle device. The flange 31 as adjacent the inner side of the ground wheel 33, 34, may provide a convenient mounting say for brake devices.

One of the features of this invention is that each wheel is independently mounted with the entire spring mechanism for that wheel, there being no cross axle between a wheel on the opposing side of the vehicle, but each mounted entirely separately.

What is claimed and it is desired to secure by United States Letters Patent is:

A ground wheel mounting for a trailer embodying a trailer chassis having a pair of parallel side frames, a pair of opposing channels in carrying position for the chassis and connecting the side frames, a pair of fixed brackets in the channels and extending therefrom toward each other, a shackle link directly mounted by one of said fixed brackets, a lever directly mounted by the other of said fixed brackets, said lever extending normally toward the shackle link connection to its fixed bracket, a ground wheel axle at the free end of the lever, a second shackle link having pivotal connection directly to the lever between the wheel axle and the lever connection to its fixed mounting bracket, and a leaf spring connected to each of the shackle links and extending beneath the axle, whereby the leaf spring has shackle floating freedom relatively to the chassis and the axle has lever floating freedom relatively to the chassis and directly influenced by one shackle connection of the spring to the lever.

CLYDE H. CARTER.
*Administrator of the Estate of August J. Grabach, Deceased.*